(12) United States Patent
Min et al.

(10) Patent No.: US 11,431,600 B2
(45) Date of Patent: Aug. 30, 2022

(54) TECHNOLOGIES FOR GPU ASSISTED NETWORK TRAFFIC MONITORING AND ANALYSIS

(71) Applicant: Intel Corporation, Santa Clara, CA (US)

(72) Inventors: Alexander W. Min, Portland, OR (US); Jr-Shian Tsai, Portland, OR (US); Janet Tseng, Portland, OR (US); Kapil Sood, Portland, OR (US); Tsung-Yuan C. Tai, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/185,426

(22) Filed: Feb. 25, 2021

(65) Prior Publication Data
US 2021/0273868 A1     Sep. 2, 2021

Related U.S. Application Data

(63) Continuation of application No. 14/671,863, filed on Mar. 27, 2015, now Pat. No. 10,972,371.

(51) Int. Cl.
*G06F 15/16*     (2006.01)
*H04L 43/0876*     (2022.01)
(Continued)

(52) U.S. Cl.
CPC ........ *H04L 43/0876* (2013.01); *H04L 43/062* (2013.01); *H04L 45/70* (2013.01);
(Continued)

(58) Field of Classification Search
CPC . H04L 41/046; H04L 41/048; H04L 43/0876; H04L 43/062; H04L 45/70;
(Continued)

(56) References Cited

U.S. PATENT DOCUMENTS

| 8,938,723 B1 * | 1/2015 | Tormasov ................. G06F 8/52 717/136 |
| 9,559,975 B1 | 1/2017 | Chen et al. |

(Continued)

FOREIGN PATENT DOCUMENTS

| CN | 102036043 A | 4/2011 |
| CN | 102780873 A | 11/2012 |

(Continued)

OTHER PUBLICATIONS

Wenji, "A GPU-Accelerated Network Traffic Monitoring and Analysis System",2013 (Year: 2013).*

(Continued)

*Primary Examiner* — Melvin H Pollack
*Assistant Examiner* — Messeret F Gebre
(74) *Attorney, Agent, or Firm* — Compass IP Law, PC (57) ABSTRACT

Technologies for monitoring network traffic include a computing device that monitors network traffic at a graphics processing unit (GPU) of the computing device. The computing device manages computing resources of the computing device based on results of the monitored network traffic. The computing resources may include one or more virtual machines to process network traffic that is to be monitored at the GPU of the computing device. Other embodiments are described and claimed.

18 Claims, 7 Drawing Sheets

(51) Int. Cl.

| | |
|---|---|
| *H04L 43/062* | (2022.01) |
| *H04L 47/70* | (2022.01) |
| *H04L 47/76* | (2022.01) |
| *H04L 47/20* | (2022.01) |
| *H04L 45/00* | (2022.01) |

(52) U.S. Cl.
CPC .............. *H04L 47/20* (2013.01); *H04L 47/76* (2013.01); *H04L 47/82* (2013.01)

(58) Field of Classification Search
CPC ......... H04L 47/20; H04L 47/76; H04L 47/82; H04L 41/0896; H04L 43/50
See application file for complete search history.

(56) References Cited

U.S. PATENT DOCUMENTS

| | | | |
|---|---|---|---|
| 9,697,026 B1* | 7/2017 | Liu ..................... G06F 21/606 |
| 2008/0049640 A1 | 2/2008 | Heinz et al. | |
| 2011/0289204 A1 | 11/2011 | Hansson et al. | |
| 2013/0055257 A1 | 2/2013 | Yamashita | |
| 2014/0007097 A1 | 1/2014 | Chin et al. | |
| 2015/0040121 A1 | 2/2015 | Barabash et al. | |
| 2015/0040220 A1* | 2/2015 | Mantripragada ....... H04L 12/66 726/22 |
| 2015/0043334 A1* | 2/2015 | Antony ............... H04L 63/1458 370/230 |
| 2015/0085870 A1 | 3/2015 | Narasimha et al. | |
| 2015/0195137 A1* | 7/2015 | Kashyap ............... H04L 61/103 370/254 |

FOREIGN PATENT DOCUMENTS

| | | |
|---|---|---|
| CN | 104378264 A | 2/2015 |
| CN | 103888485 B | 3/2018 |
| WO | 2015047836 A1 | 4/2015 |

OTHER PUBLICATIONS

A. Cirneci, S. Boboc, C. Leordeanu, V. Cristea and C. Estan, "Netpy: Advanced Network Traffic Monitoring," 2009 International Conference on Intelligent Networking and Collaborative Systems, 2009, pp. 253-254, doi: 10.1109/INCOS.2009.13. (Year: 2009).*

Hong, J. W.-., Kwon, S.-., & Kim, J.-. (1999). WebTrafMon: Web-based Internet/Intranet network traffic monitoring and analysis system. Computer Communications, 22(14), 1333-42. doi:http://dx.doi.org/10.1016/S0140-3664(99)00130-9 (Year: 1999).*

J. Liu and J. Huang, "Broadband network traffic analysis and study in various types of applications," 2010 International Conference on Intelligent Control and Information Processing, 2010, pp. 439-442, doi: 10.1109/ICICIP.2010.5564168. (Year: 2010).*

F. Ricciato, "Traffic monitoring and analysis for the optimization of a 3G network," in IEEE Wireless Communications, vol. 13, No. 6, pp. 42-49, Dec. 2006, doi: 10.1109/MWC.2006.275197. (Year: 2006).*

Chinese and English translation of Notice of Allowance for Chinese Patent Application No. 201610157999.X, dated Dec. 3, 2021, 6 pages.

Chinese and English Translation of P.R. China State Intellectual Property Office Decision of Rejection for Patent Application No. 201610157999.X, dated Jun. 15, 2021, 19 pages.

English and German Translation of German Office Action for Patent Application No. 102016103492.4, dated Oct. 29, 2021, 22 pages.

Advisory Action for U.S. Appl. No. 14/671,863, dated Dec. 1, 2017, 3 pages.

Final Office Action for U.S. Appl. No. 14/671,863, dated Jun. 29, 2017, 19 pages.

First Office Action for U.S. Appl. No. 14/671,863, dated Dec. 16, 2016, 17 pages.

First Office Action in Chinese patent application No. 20161057999, dated Oct. 31, 2018, including machine translation (14 pages).

Fourth Chinese Office Action of P.R. China State Intellectual Property Office for Patent Application No. 201610157999.X, dated Nov. 6, 2020, 6 pages.

Krieghbaum, D. M. (2014). Using machine learning techniques for analyzing educational dialogues and student responses (Order No. 1558703), 2014. pp. 1-7. (Year 2014).

M. Vankipuram, K. Kahal, A. Ashby, J. Hamilton, J. Ferrara and M. Smith, "Virtual reality based training to resolve visio-motor conflicts in surgical environments," 2008 IEEE International Workshop on Haptic Audio visual Environments and Games, Ottawa, Ont., 2008, pp. 7-12. (Year: 2008).

Notice of Allowance for U.S. Appl. No. 14/671,863, dated Nov. 24, 2020, 6 pages.

Sahil Suneja, Elliott Baron, Eyal de Lara, Ryan Johnson, "Accelerating The Cloud with Heterogeneous Computing", 2011 pp. 1-5. (Year 2011).

Second Advisory Action for U.S. Appl. No. 14/671,863, dated Apr. 8, 2019, pages.

Second Final Office Action for U.S. Appl. No. 14/671,863, dated Jan. 25, 2019, 22 pages.

Second Office Action for U.S. Appl. No. 14/671,863, dated Jun. 28, 2018, 24 pages.

Second Office Action in Chinese patent application No. 20161057999, dated Jul. 10, 2019, including machine translation (8 pages).

Third Advisory Action for U.S. Appl. No. 14/671,863, dated Mar. 2, 2020, 2 pages.

Third Final Office Action for U.S. Appl. No. 14/671,863, dated Dec. 12, 2019, 21 pages.

Third Office Action for U.S. Appl. No. 14/671,863, dated Jun. 4, 2019, 19 pages.

Third Office Action in Chinese patent application No. 20161057999, dated Apr. 1, 2020, including machine translation, 6 pages.

W. Wu, P. DeMar, D. Holmgren and A. Singh, "G-NetMon: A GPU-accelerated Network Performance Monitoring System," 2011 Symposium on Application Accelerators in High-Performance Computing, Knoxville, TN, 2011, pp. 76-79.

Wenji Wu, "Network Traffic Monitoring and Analysis with GPU's", Dec. 17, 2013.

Wu, Wenji. "Network Traffic Monitoring and Analysis with GPUs", http ://web.archive.org/web/20131217094303/http://sc13.supercomputing .org/sites/default/files/PostersArchive/tech_posters/post161s2-file2.pdf. Dec. 17, 2013, pp. 1.

* cited by examiner

TECHNOLOGIES FOR GPU ASSISTED NETWORK TRAFFIC MONITORING AND ANALYSIS

CLAIM OF PRIORITY

This application is a Continuation of, and claims the benefit of priority of, U.S. application Ser. No. 14/671,863, filed Mar. 27, 2015, which is incorporated herein by reference in its entirety.

BACKGROUND

Typically, to ensure network traffic communications (i.e., network packets/flows) are being efficiently passed through their networks, network service providers (e.g., internet service providers (ISPs), telecommunications service providers (TSPs)) monitor network traffic (i.e., incoming and outgoing network packets/flows) through their networks continuously. For example, such continuous monitoring of the network traffic may include various health checks, resource allocation/usage, application usage, data leakage, intrusion detection, and the like. Traditionally, traffic monitoring has been performed by duplicating and/or filtering network traffic and redirecting the duplicated and/or filtered network traffic, via port mirroring on switches and routers, for example, to remotely located network devices (e.g., proprietary middle-boxes) dedicated to processing the aggregated network traffic.

As a result of advances in virtualization technologies, such as virtual machines (VMs), software defined networks (SDNs), network functions virtualization (NFV), and the like, network service providers can consolidate network functionality that was previously run on remotely located proprietary hardware into single commodity servers capable of running multiple VMs on general purpose hardware. Accordingly, more powerful compute and input/output resources may be necessary to manage the increased network resource workload. However, offloading the increased amount of network bandwidth and information on system resources, both physical and virtual, may introduce latency and increase bandwidth usage. Using existing methods, performing the network traffic monitoring and analysis locally may result in reduced application performance and tax the limited platform resources (e.g., central processing unit (CPU) cores, network interface card (NIC) interfaces, etc.) that can be allocated to perform the network traffic monitoring and analysis locally.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
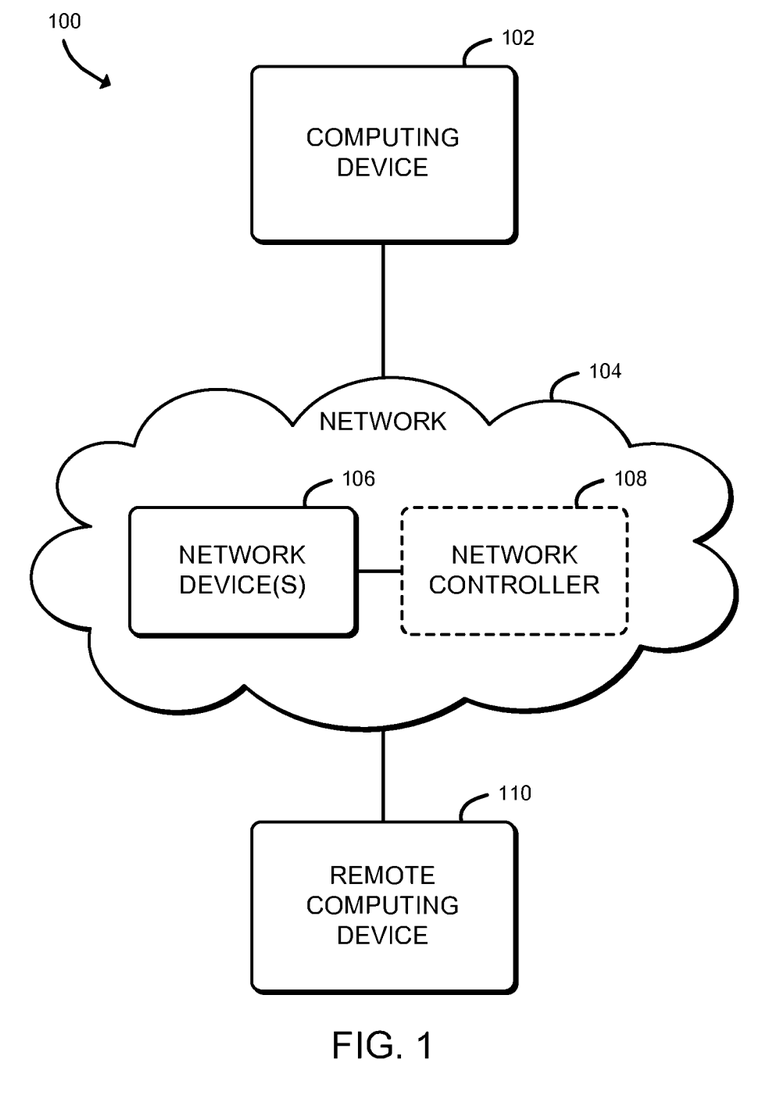
FIG. 1 is a simplified block diagram of at least one embodiment of a system for monitoring and analyzing network traffic a network device.

Referring now to FIG. 1, in an illustrative embodiment, a system 100 for monitoring and analyzing network traffic data (i.e., data related to network communication packets/flows) includes a computing device 102 and a remote computing device 110 in communication over a network 104 via one or more network devices 106. In use, the network devices 106 facilitate network communications (i.e., network packets/flows) between the computing device 102 and the remote computing device 110 over the network 104. For example, the computing device 102 may request data from the remote computing device 110 by sending one or more network packets that indicate the computing device 102 is requesting data from the remote computing device 110. In response to the request, the remote computing device 110 may attempt to transmit response data (i.e., a payload) via one or more network packets to the computing device 102 across the network 104.

Typically, the network packets are monitored as they are processed through the network devices 106. For example, a network device 106 may allocate a number of computing resources for one or more virtual machines (VMs) to perform various network functions or services (e.g., firewall services, network address translation (NAT) services, load-balancing services, deep packet inspection (DPI) services, transmission control protocol (TCP) optimization services, 4G/LTE network services, etc.) on the network packets. Accordingly, the network device 106 may monitor each VM performing a particular service to determine various network traffic related parameters, such as an efficiency level of the allocated computing resources, health checks, bandwidth usage, intrusion detection, etc. Unlike traditional network traffic monitoring systems, wherein monitoring data is off-loaded to a remote network device for processing and returning results of the processed monitoring data, the network device 106 may analyze the monitored data locally.

To do so, as described in further detail below, the relevant processing of the network packets is performed by a graphics processing unit (GPU) of the network device 106, which may be capable of parallelizing network packet processing (e.g., internet protocol (IP) forwarding, hashing, pattern matching, etc.) via a number of cores of the GPU. Accordingly, GPUs can supplement a central processing unit (CPU) by providing electronic circuitry that can perform mathematical operations rapidly using extensive parallelism and many concurrent threads. As a result, the CPU of the network device 106 can be dedicated to other tasks, such as application performance management. For ease of discussion, "graphics processing unit" or "GPU" may be used herein to refer to, among other things, a graphics processing unit, a graphics accelerator, or other type of specialized electronic circuit or device, such as a general purpose GPU (GPGPU) or any other device or circuit that is configured to be used by the network device 106 to accelerate graphics tasks and/or perform other parallel computing operations that would benefit from accelerated processing, such as network traffic monitoring.

The computing device 102 may be embodied as any type of computation or computing device capable of performing the functions described herein, including, without limitation, a computer, a desktop computer, a smartphone, a workstation, a laptop computer, a notebook computer, a tablet computer, a mobile computing device, a wearable computing device, a network appliance, a web appliance, a distributed computing system, a processor-based system, and/or a consumer electronic device. Similarly, the remote computing device 110 may be embodied as any type of computation or computing device capable of performing the functions described herein, including, without limitation, a computer, a desktop computer, a smartphone, a workstation, a laptop computer, a notebook computer, a tablet computer, a mobile computing device, a wearable computing device, a network appliance, a web appliance, a distributed computing system, a processor-based system, and/or a consumer electronic device. Each of the computing device 102 and the remote computing device 110 may include components commonly found in a computing device such as a processor, memory, input/output subsystem, data storage, communication circuitry, etc.

The network 104 may be embodied as any type of wired or wireless communication network, including cellular networks (e.g., Global System for Mobile Communications (GSM), 3G, Long Term Evolution (LTE), Worldwide Interoperability for Microwave Access (WiMAX), etc.), digital subscriber line (DSL) networks, cable networks (e.g., coaxial networks, fiber networks, etc.), telephony networks, local area networks (LANs) or wide area networks (WANs), global networks (e.g., the Internet), or any combination thereof. Additionally, the network 104 may include any number of network devices 106 as needed to facilitate communication between the computing device 102 and the remote computing device 110.

In some embodiments, the network device 106 may additionally be connected to a network controller 108. The network controller 108 may be embodied as, or otherwise include, any type of hardware, software, and/or firmware capable of providing a platform for performing the functions described herein, such a computing device, a multiprocessor system, a server (e.g., stand-alone, rack-mounted, blade, etc.), a network appliance, a compute device, etc. In some embodiments, the network controller 108 may be configured to store and/or maintain topology information of the network 104 (i.e., the arrangement and interconnectivity of the network devices 106) and/or network packet management information (e.g., network packet/flow management/processing information, policies corresponding to network packet types/flows, etc.). For example, the network controller 108 may be configured to function as a software-defined networking (SDN) controller, a network functions virtualization (NFV) manager and network orchestrator (MANO), etc. Accordingly, the network controller 108 may send (e.g., transmit, etc.) network flow information (e.g., network packet/flow policies) to the network devices 106 capable of operating in an SDN environment and/or a NFV environment.

Figure 2:
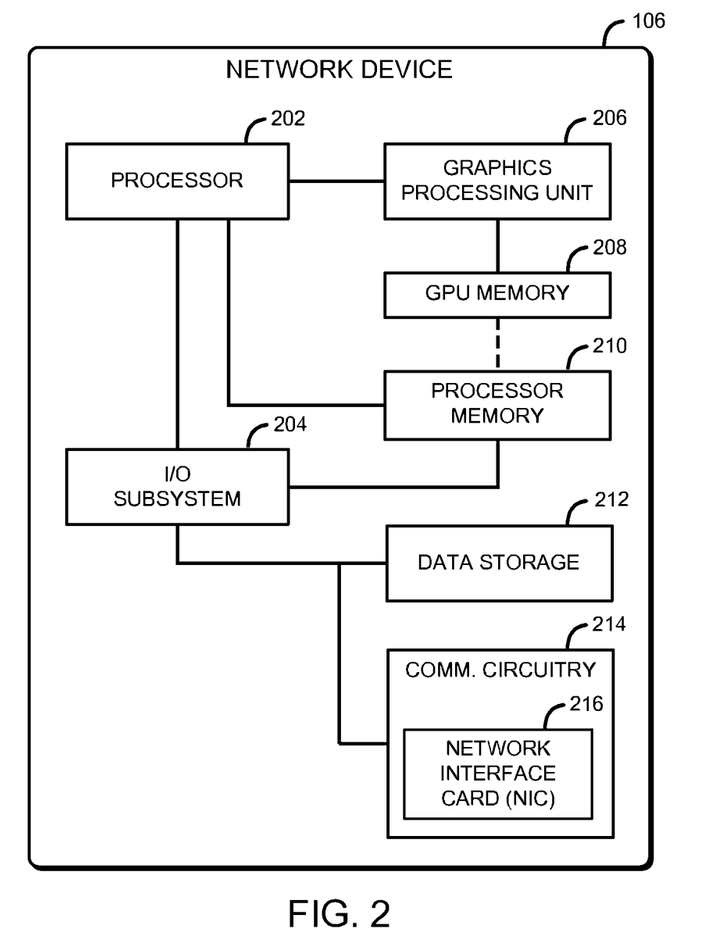
FIG. 2 is a simplified block diagram of at least one embodiment of the network device of the system of FIG. 1.

The network device 106 may be embodied as any type of computing device capable of facilitating wired and/or wireless network communications between the computing device 102 and the remote computing device 110. For example, the network devices 106 may be embodied as a computing device, an access point, a router, a switch, a network hub, a storage device, a compute device, a multi-processor system, a server (e.g., stand-alone, rack-mounted, blade, etc.), a network appliance (e.g., physical or virtual), etc. As shown in FIG. 2, an illustrative network device 106 includes a processor 202 (i.e., a CPU), an input/output (I/O) subsystem 204, a GPU 206, a GPU memory 208, a processor memory 210, a data storage device 212, and communication circuitry 214 that includes a network interface card (NIC) 216. Of course, in other embodiments, the network device 106 may include other or additional components, such as those commonly found in a network device (e.g., virtualization services, drivers, operating systems, schedulers, etc.). Additionally, in some embodiments, one or more of the illustrative components may be incorporated in, or otherwise form a portion of, another component. For example, in some embodiments, the processor memory 210, or portions thereof, may be incorporated in the processor 202 and/or the GPU memory 208 may be incorporated in the GPU 206, in some embodiments.

The processor 202 may be embodied as any type of processor capable of performing the functions described herein. The processor 202 may be embodied as a single or multi-core processor(s), digital signal processor, microcontroller, or other processor or processing/controlling circuit. The I/O subsystem 204 may be embodied as circuitry and/or components to facilitate input/output operations with the processor 202, the processor memory 210, the GPU 206, the GPU memory 208, and other components of the network device 106. For example, the I/O subsystem 204 may be embodied as, or otherwise include, memory controller hubs, input/output control hubs, integrated sensor hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 204 may form a portion of a system-on-a-chip (SoC) and be incorporated, along with the processors 202, the GPU 206, the GPU memory 208, the processor memory 210, and other components of the network device 106, on a single integrated circuit chip.

The GPU 206 includes an array of processor cores or parallel processors, each of which can execute a number of parallel and concurrent threads to handle specific types of GPU task. For example, in some embodiments, the processor cores of the GPU 206 may be configured to individually handle 3D rendering tasks, blitter (e.g., 2D graphics), video, and video encoding/decoding tasks. The GPU 206 may be embodied as a peripheral device (e.g., on a discrete graphics card), or may be located on the processor 202 motherboard or on the processor 202 die.

The GPU memory 208 and the processor memory 210 may be embodied as any type of volatile or non-volatile memory or data storage capable of performing the functions described herein. In operation, the processor memory 210 may store various data and software used during operation of the computing device 102 such as operating systems, applications, programs, libraries, and drivers. For example, portions of the processor memory 210 may at least temporarily store command buffers and GPU commands that are created by the processor 202, and portions of the GPU memory 208 may at least temporarily store the GPU commands received from the processor memory 210 by, e.g., direct memory access (DMA). The GPU memory 208 is communicatively coupled to the GPU 206, and the processor memory 210 is similarly communicatively coupled to the processor 202 via the I/O subsystem 204.

The data storage device 212 may be embodied as any type of device or devices configured for short-term or long-term storage of data such as, for example, memory devices and circuits, memory cards, hard disk drives, solid-state drives, or other data storage devices. The data storage device 212 may include a system partition that stores data and firmware code for the network device 106. The data storage device 212 may also include an operating system partition that stores data files and executables for an operating system of the network device 106.

The communication circuitry 214 may be embodied as any communication circuit, device, or collection thereof, capable of enabling communications over the network 104 between the network device 106 and the computing device 102, another network device 106, the network controller 108, and/or the remote computing device 110. The communication circuitry 214 may be configured to use any one or more communication technology (e.g., wired or wireless communications) and associated protocols (e.g., Ethernet, Bluetooth®, Wi-Fi®, WiMAX, etc.) to effect such communication.

The communication circuitry 214 additionally includes a network interface card (NIC) 216. The NIC 216 may connect the computing device 102, the remote computing device 110, and/or another network device 106 to one of the network devices 106. The NIC 216 may be embodied as one or more add-in-boards, daughtercards, network interface cards, controller chips, chipsets, or other devices that may be used by the network device 106. For example, the NIC 216 may be embodied as an expansion card coupled to the I/O subsystem 204 over an expansion bus, such as PCI Express.

Figure 3:
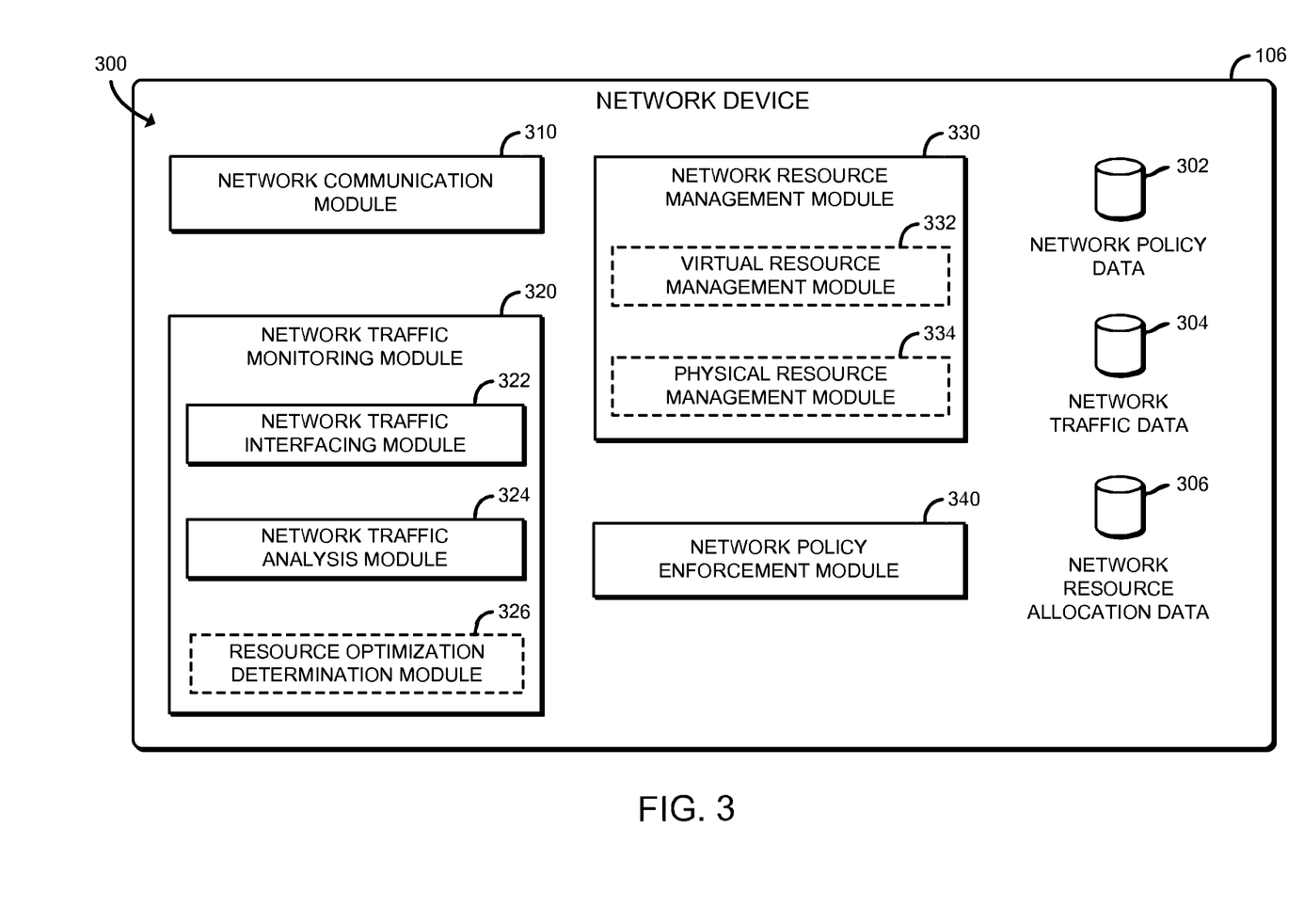
FIG. 3 is a simplified block diagram of at least one embodiment of an environment that may be established by the network device of FIG. 2.

Referring now to FIG. 3, in an embodiment, the network device 106 establishes an environment 300 during operation. The illustrative environment 300 includes a network communication module 310, a network traffic monitoring module 320, a network resource management module 330, and a network policy enforcement module 340. Each of the modules, logic, and other components of the environment 300 may be embodied as hardware, software, firmware, or a combination thereof. For example, each of the modules, logic, and other components of the environment 300 may form a portion of, or otherwise be established by, the processor 202 or other hardware components of the network device 106. As such, in some embodiments, one or more of the modules of the environment 300 may be embodied as a circuit or collection of electrical devices (e.g., a network traffic monitoring circuit, a network resource management circuit, a network policy enforcement circuit, etc.). In the illustrative environment 300, the network device 106 includes network policy data 302, network traffic data 304, and network resource allocation data 306, each of which may be accessed by the various modules and/or sub-modules of the network device 106. It should be appreciated that the network device 106 may include other components, sub-components, modules, and devices commonly found in a network device, which are not illustrated in FIG. 3 for clarity of the description.

The network communication module 310 is configured to facilitate inbound and outbound network communications (e.g., network traffic, network packets, network flows, etc.) to and from the network device 106. In other words, the network communication module 310 is configured to receive and process network packets received from one computing device (e.g., the computing device 102, another network device 106, the remote computing device 110) and to prepare and transmit network packets to another computing device (e.g., the computing device 102, another network device 106, the remote computing device 110). Accordingly, in some embodiments, at least a portion of the functionality of the network communication module 310 may be performed by the communication circuitry 214, and more specifically by the NIC 216.

The network traffic monitoring module 320 is configured to determine monitoring results of the network traffic. Accordingly, the network traffic monitoring module 320 may monitor network traffic to and from the network device 106 (e.g., via the NIC 216), and network traffic that is internally originated by the network device 106. It should be appreciated that, in some embodiments, one or more functions of the network traffic monitoring module 320 may be performed by the GPU 206 to take advantage of the parallel processing capability of the GPU 206 and reduce the workload on the processor 202. The network traffic monitoring module 320 may include a network traffic interfacing module 322 to interface with various VMs, applications, and the like presently being executed by the network device 106 for receiving the network traffic and/or network traffic related information as input to the network traffic monitoring module 320. In some embodiments, the network traffic interfacing module 322 may receive the network traffic via shared memory, Peripheral Component Interconnect Express (PCIe), and the like. Additionally, in some embodiments, data related to the network traffic, such as network packets signatures, associated flows, internet protocol (IP) address/port source/destination, etc., may be included in the network traffic data 304.

The network traffic monitoring module 320 may additionally include a network traffic analysis module 324 to analyze the network traffic. For example, the network traffic analysis module 324 may monitor specific network traffic based on the present topology, allocation of computing resources, network related policies, and/or usage of the various VMs, applications, and the like being executed by the network device 106. In some embodiments, the network traffic monitoring module 320 may additionally include a resource optimization determination module 326 to determine network resource optimization recommendations (e.g., a number of VMs for running virtual services, allocation of memory to the VMs, etc.). Additionally, in some embodiments, the resource optimization determination module 326 may provide the network resource optimization recommendations to the network resource management module 330. In some embodiments, data related to monitoring the network traffic may be included in the network traffic data 304.

Figure 4:
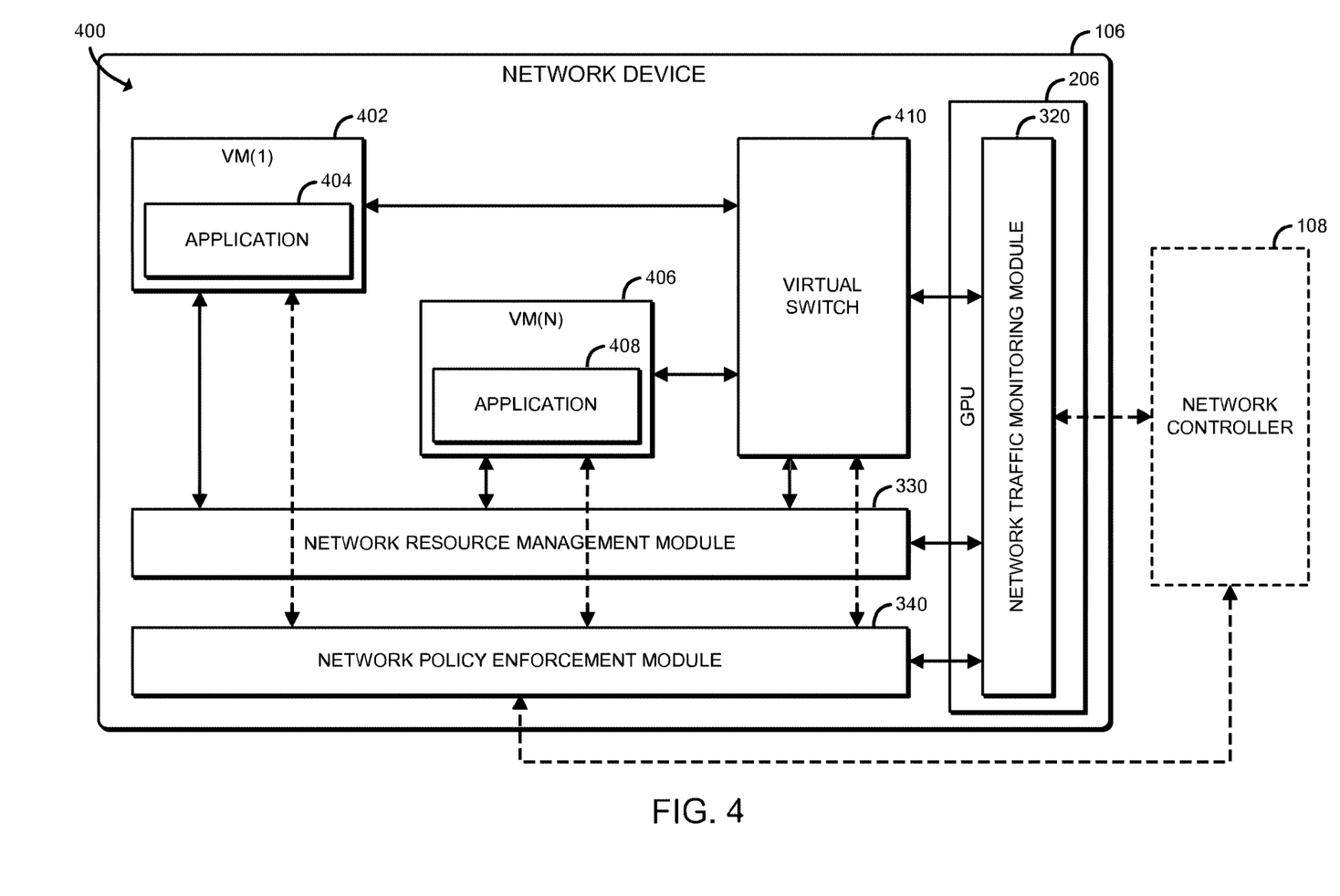
FIG. 4 is a simplified block diagram of another embodiment of an environment that may be established by the network device of FIG. 2.

The network resource management module 330 is configured to manage the allocation of computing, or network, resources of the network device 106 based on performance (e.g., end-to-end throughput, latency, etc.) capabilities and a present workload of the network device 106. To do so, as shown in FIG. 4, the network resource management module 330 may be capable of instantiating (i.e., creating) VMs, suspending VMs, shutting down (i.e., closing) VMs, and redirecting network traffic to a hardware accelerator for faster processing. In some embodiments, the network resource allocation may be based on the network resource optimization recommendations, which may be received from the network traffic monitoring module 320. It should be appreciated that, in some embodiments, one or more functions of the network resource management module 330 may be performed by the processor 202 and/or the GPU 206. It should be further appreciated that the network traffic monitoring module 320 and the network resource management module 330 may communicate via shared memory. In some embodiments, one of more functions performed by the network resource management module 330 may be performed by sub-modules, for example, by virtual resource management module 332 and/or a physical resource management module 334.

The network policy enforcement module 340 is configured to enforce network policies (e.g., network flow based routing policies and/or switching policies, etc.). In other words, the network policy enforcement module 340 is configured to detect and correct network traffic that does not comply with the network policies. For example, to correct the network traffic that is detected not to be in compliance with the network policies, various corrective actions may be taken, such as changing a switching policy, switching a routing policies, and/or dropping particular network packets/flows based on the network policies. In some embodiments, the network policies may be based on a type of the network packet/flow, a type of workload of the network packet, etc. Additionally, in some embodiments, data related to the network policies may be included in the network policy data 302.

Referring now to FIG. 4, an operational environment 400 of the network device 106 is shown. The illustrative operational environment 400 includes the network traffic monitoring module 320, the network resource management module 330, and the network policy enforcement module 340 of FIG. 3, as well as a virtual switch 410. While the network traffic monitoring module 320 is shown in the illustrative operational environment 400 as running on the GPU 206, it should be appreciated that, in some embodiments, the network resource management module 330 may additionally be running on the GPU 206.

In the illustrative operational environment 400, the network device is executing a first virtual machine, which is designated as VM(1) 402, and a second virtual machine, which is designated as VM(N) 406 (i.e., the "Nth" virtual machine running on the network device 106, wherein "N" is a positive integer and designates one or more additional virtual machines running on the network device 106). Each of the VM(1) 402 and the VM(N) 406 include a corresponding application, a first application 404 and an "Nth" application 408, respectively. It should be appreciated that one or more of the VMs 402, 406 may run more than one application. The applications 404, 408 may indicate any type of service or other network processing function presently being performed via the VMs 402, 406 on the network packets, such as a firewall, a network address translation (NAT), load-balancing, a deep packet inspection (DPI), transmission control protocol (TCP) optimization, etc. For example, the VMs 402, 406 may be configured to function as a service chain comprised of a number of VMs to perform certain services on the network packets based on various factors, such as type, flow, workload, destination, etc.

The virtual switch 410 may be configured to manage the internal data transfer of network traffic related information between the network traffic monitoring module 320, the network resource management module 330, and the network policy enforcement module 340. For example, the network traffic monitoring module 320 may receive mirrored and/or duplicated network traffic that is to be processed internally (i.e., the applications 404, 408 running on the local VMs 402, 406), as well as incoming traffic from an externally located computing device (e.g., the computing device 102, another network device 106, the remote computing device 110). Additionally, the network policy enforcement module 340 may also mirror and/or duplicate network traffic to perform inspections on based on the network policies. Accordingly, the virtual switch 410 may be configured to facilitate the transfer of the mirrored and/or duplicated network traffic between the VMs 402, 406 and the network traffic monitoring module 320, the network resource management module 330, and/or the network policy enforcement module 340.

In some embodiments, as described previously, the network device 106 may be connected to a network controller 108 that is located external to the network device 106. As also described previously, the network controller 108 may be in communication with the network policy enforcement module 340 to provide network policy information and, as will be described in further detail below, the network controller 108 may additionally be in communication with the network traffic monitoring module 320.

Figure 5:
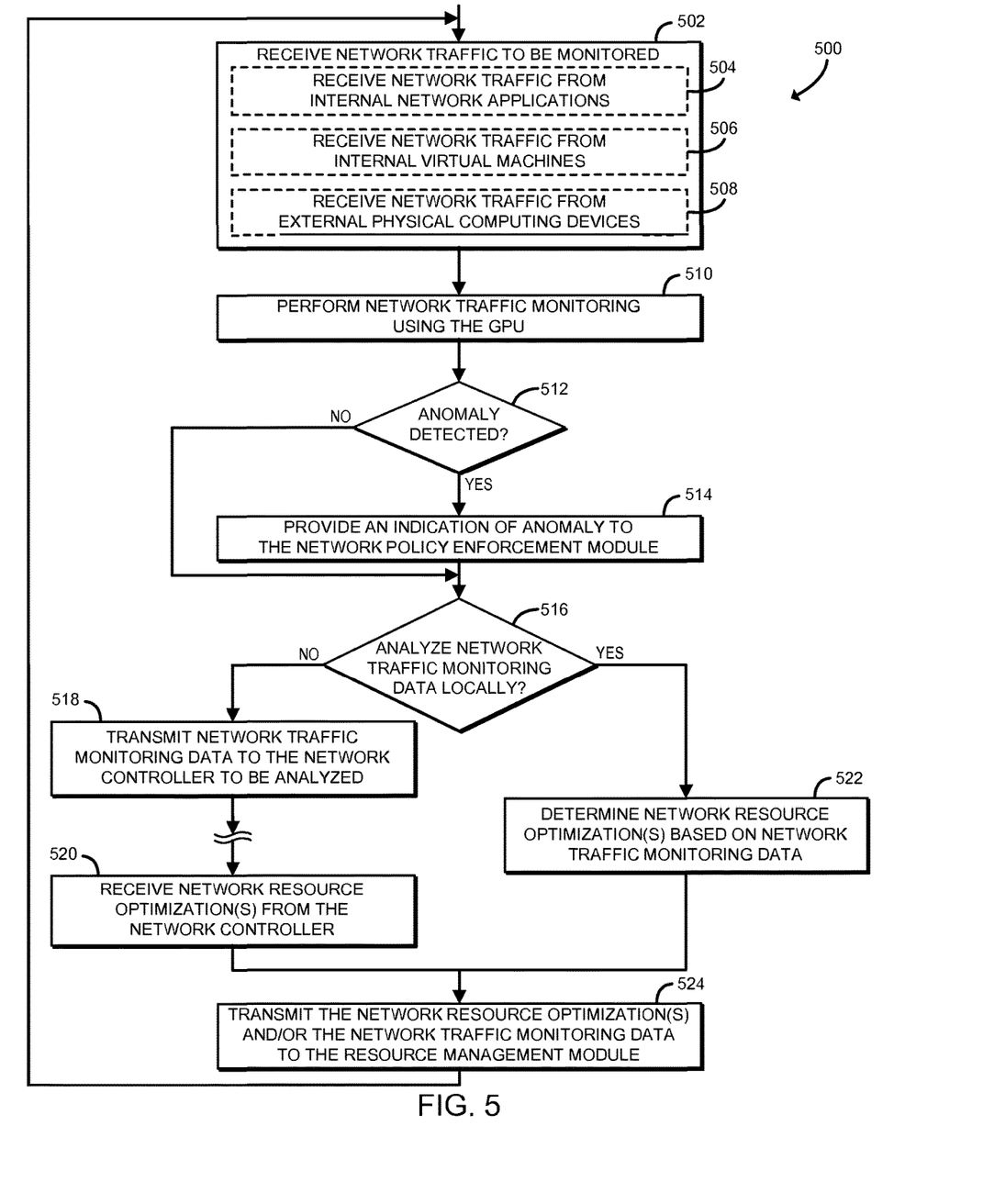
FIG. 5 is a simplified flow diagram of at least one embodiment of a method for determining network resource optimizations using network traffic monitoring data that may be executed by the network device of FIG. 2.

Referring now to FIG. 5, in use, the network device 106 may execute a method 500 for determining network resource optimizations based on network traffic monitoring data. It should be appreciated that, in some embodiments, at least a portion of the functionality of the illustrative method 500 may be performed via the network traffic monitoring module 320, which may be established by the GPU 206. The method 500 begins with block 502, in which the network device 106 receives network traffic (e.g., network packets, network flows, etc.) to be monitored. In some embodiments, the network device 106 may request to only receive particular network traffic (e.g., a type of network packet, a type of flow, a type of workload, etc.) based on network policies and/or a present configuration of the network device 106 (i.e., the number of and/or interconnectivity between the applications and/or VMs presently being executed by the network device 106).

The network traffic received by the network device 106 may be embodied as any type of internal and/or external network communications generated and/or processed by the network device 106. For example, in some embodiments, in block 504, the received network traffic may be generated via locally executed network applications, or appliances. Additionally or alternatively, in some embodiments, in block 506, the network traffic may be received from locally executed VMs running various services (e.g., the locally executed network applications, as shown in FIG. 4) to process the network traffic, such as firewalls, NATs, load-balancers, DPIs, TCP optimizations, etc. It should be appreciated that, in such embodiments, the received network traffic to be monitored may be duplicated or mirrored network traffic. In some embodiments, in block 508, the network device 106 may additionally or alternatively receive network traffic that originated from an externally located physical computing device, such as the computing device 102, another network device 106, and/or the remote computing device 110.

At block 510, the network device 106 performs the network traffic monitoring using the GPU 206. Unlike traditional methods of monitoring network traffic that require transmitting network traffic to externally located proprietary hardware based monitoring and/or centralized entities via physical links, the network device 106 leverages the compute power (i.e., parallelism, statelessness, concurrency, etc.) of the GPU 206 to monitor and analyze traffic. Accordingly, leveraging the GPU 206 may result in increased security, energy efficiency, and resource utilization while reducing bandwidth usage and latency attributable to transmitting the network traffic. In some embodiments, the network traffic to be monitored may be determined based on the network policies and/or the present configuration of the network device 106 (e.g., input from the network resource management module 330). For example, if the network resource management module 330 detects an increase in resource usage for a VM, the network resource management module 330 can request the network traffic flowing through that VM to be analyzed to identify a cause of the increased resource usage.

At block 512, the network device 106 determines whether an anomaly was detected during the network traffic monitoring. If so, the network device 106 provides an indication of the anomaly to the network policy enforcement module 340. If not, the network device 106 advances to block 516. At block 516, the network device 106 determines whether to analyze the network traffic monitoring data (i.e., results of the network traffic monitoring) locally. In other words, the network device 106 determines whether the network device 106 internally analyzes the network traffic monitoring data, or whether a network controller in external network communication with the network device 106 (e.g., the network controller 108 of FIG. 1) is to analyze the network traffic monitoring data.

If the network device 106 determines the network controller 108 is to analyze the network traffic monitoring data, the network device 106, at block 518, transmits the network traffic monitoring data to the network controller 108 to be analyzed. At block 520, the network device receives one or more network resource optimizations (e.g., application/VM configuration changes, network traffic monitoring algorithm changes, etc.) from the network controller 108. If the network device 106 determines to analyze the network traffic monitoring data locally, the network device 106, at block 522, determines one or more network resource optimizations (e.g., virtual processor allocation to the VMs, allocation of memory, etc.) based on the network traffic monitoring data.

At block 524, the network device 106 transmits the network resource optimizations and/or the network traffic monitoring data to the network resource management module 330. For example, if the network traffic monitoring reveals an increase in network traffic volume that requires a payload compression on a VM, the network device 106 may transmit an indication of the increase and required payload compression on the VM to the network resource management module 330.

Figure 6:
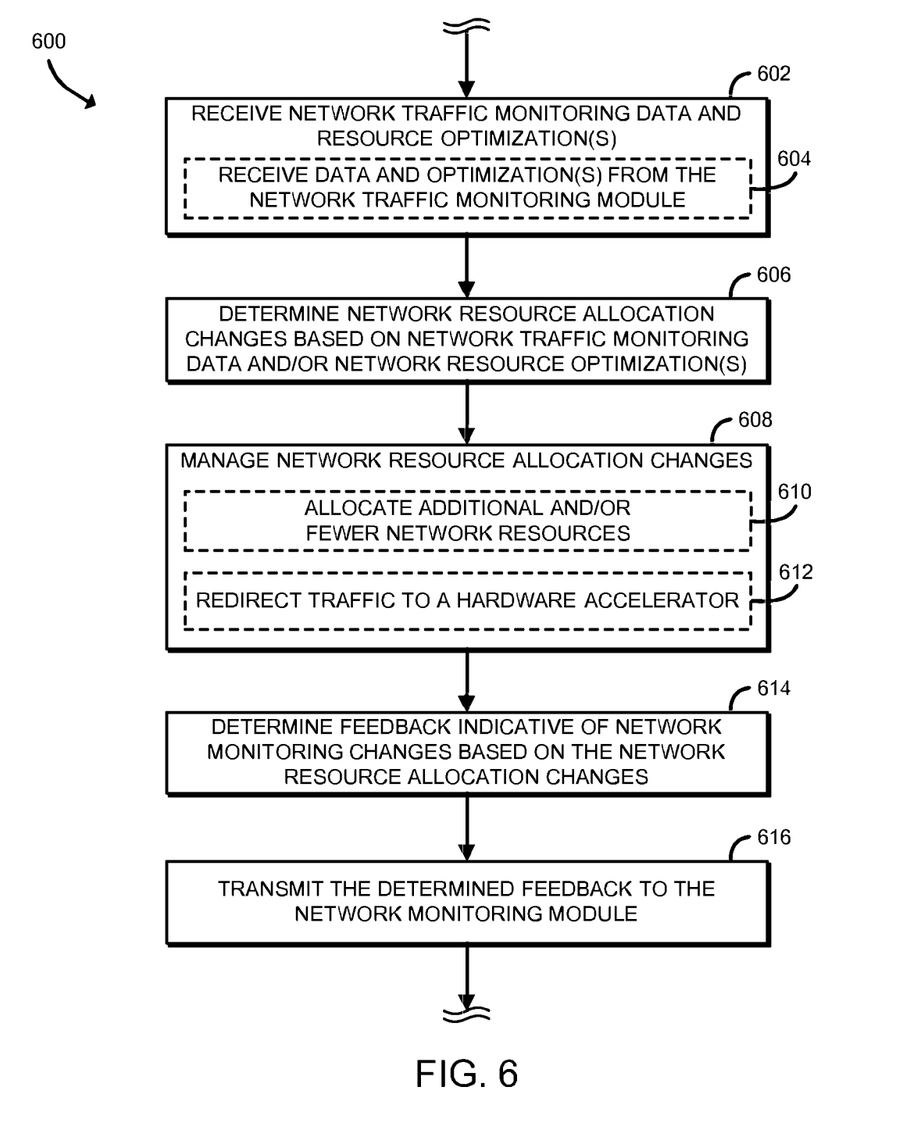
FIG. 6 is a simplified flow diagram of at least one embodiment of a method for allocating computing resources that may be executed by the network device of FIG. 2.

Referring now to FIG. 6, in use, the network device 106 may execute a method 600 for allocating computing, or network, resources. It should be appreciated that, in some embodiments, at least a portion of the functionality of the illustrative method 600 may be performed via the network resource management module 330. The method 600 begins with block 602, in which the network device 106 receives network traffic monitoring data and resource optimization(s). In some embodiments, at block 604, the network device 106 may receive the network traffic monitoring data and resource optimizations from the network traffic monitoring module 320.

At block 606, the network device 106 determines whether any resource allocation changes should be made based on the network traffic monitoring data and the resource optimizations. At block 608, the network device 106 manages any network resource allocation changes based on the network resource allocation changes determined at block 606, if applicable. In some embodiments, in block 610, the network device 106 may allocate additional and/or fewer computing resources of the network device 106. For example, if the network device 106 receives an indication of an increase in network traffic, the network device 106 may allocate additional computing resources (i.e., create additional VMs, change a processor allocation, adjust a memory allocation, etc.). Additionally or alternatively, in some embodiments, in block 612, the network device 106 may redirect some of the network traffic to a hardware accelerator for faster processing. For example, if the network device 106 receives an indication of an increasing number of network flows that require encryption, the network device 106 may redirect the network traffic to a hardware accelerator to achieve better throughput.

At block 614, the network device 106 determines feedback indicative of any network traffic monitoring changes based on the network resource allocation changes made at block 608. At block 616, the network device 106 transmits the determined feedback to the network traffic monitoring module 320, which the network traffic monitoring module 320 may use to determine which network traffic to monitor.

Figure 7:
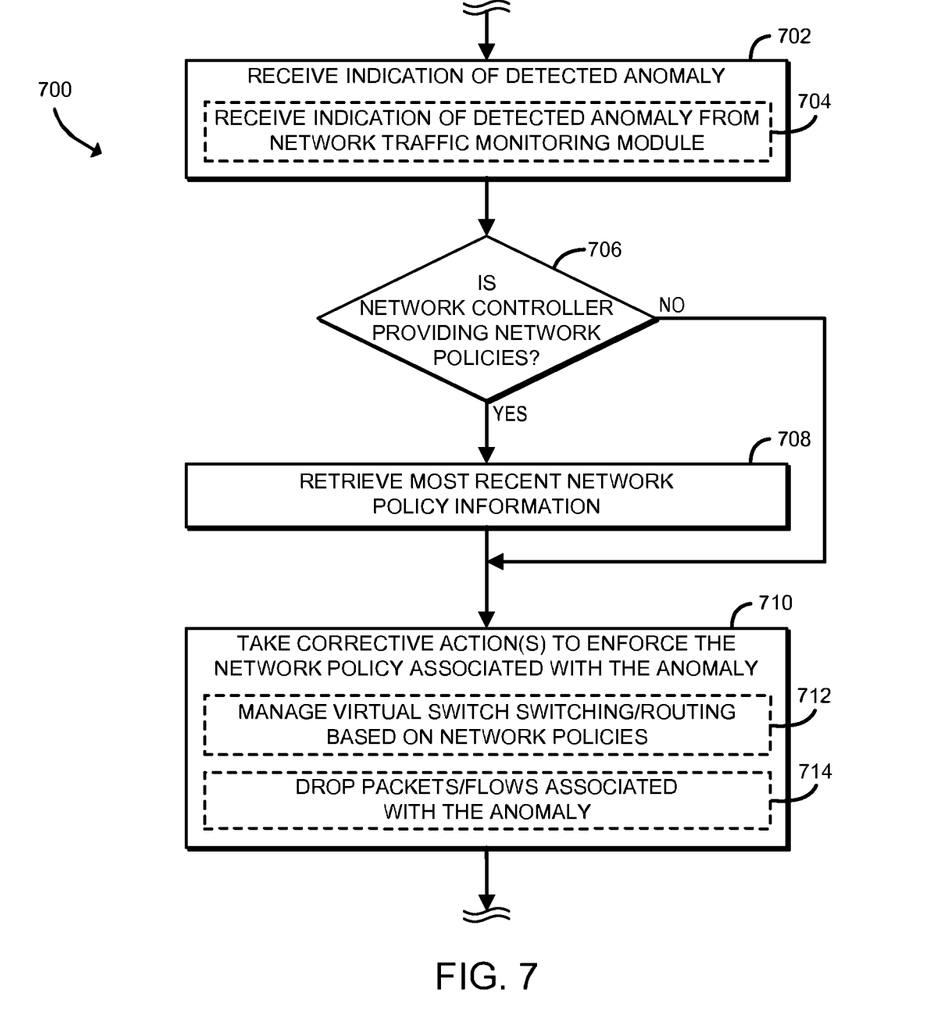
FIG. 7 is a simplified flow diagram of at least one embodiment of a method for enforcing network policies that may be executed by the network device of FIG. 2.

Referring now to FIG. 7, in use, the network device 106 may execute a method 700 for enforcing network policies. It should be appreciated that, in some embodiments, at least a portion of the functionality of the illustrative method 700 may be performed via the network policy enforcement module 340. The method 700 begins with block 702, in which the network device 106 receives an indication of a detected anomaly. In some embodiments, in block 704, the network device 106 may receive the indication of the detected anomaly from the network traffic monitoring module 320. For example, if the network traffic monitoring module 320 detects abnormal behavior of a network flow or network packet, (e.g., a signature of a network packet corresponds to a known attack signature) the network traffic monitoring module 320 may provide an indication that indicates the abnormal behavior. Additionally, as a result of the network traffic monitoring being performed on the GPU 206, the detection of the abnormality can be detected while the network packet, or network flow, is being processed by the one or more VMs (i.e., in run time).

At block 706, the network device 106 determines whether the network controller 108 is providing the network policies that the network device 106 is to enforce. If so, at block 708, the network device retrieves the most recent network policy information from the network controller 108. It should be appreciated that, in some embodiments, the network policy information may be automatically pushed to the network device 106 from the network controller 108, rather than the pull implementation described herein. If the network device 106 determines that the network controller 108 is not providing the network policies, the method 700 advances to block 710.

At block 710, the network device 106 takes a corrective action to enforce the network policy associated with the anomaly. In some embodiments, in block 712, the network device 106 may manage (i.e., change) switching/routing policies of a virtual switch (e.g., the virtual switch of FIG. 4) based on the network policies associated with the anomaly. Additionally or alternatively, in some embodiments, in block 714, the network device 106 may drop a suspicious network flow/packet associated with the anomaly before the suspicious network flow/packet is transmitted from the network device 106. It should be appreciated that the network device 106 may enforce any number of other network policies that the network device 106 is configured to or capable of enforcing.

EXAMPLES

Illustrative examples of the technologies disclosed herein are provided below. An embodiment of the technologies may include any one or more, and any combination of, the examples described below.

Example 1 includes a computing device to monitor network traffic, the computing device comprising a network resource management module to manage computing resources of the computing device, wherein the computing resources include one or more virtual machines to process the network traffic; and a graphics processing unit to establish a network traffic monitoring module to monitor, at the graphics processing unit, the network traffic processed by the one or more virtual machines.

Example 2 includes the subject matter of Example 1, and wherein the network traffic monitoring module is further to transmit results of the monitored network traffic to a network controller, and wherein the network resource management module is further to receive one or more network resource optimization recommendations from the network controller based on the results of the monitored network traffic.

Example 3 includes the subject matter of any of Examples 1 and 2, and wherein the network controller is in remote network communication with the computing device.

Example 4 includes the subject matter of any of Examples 1-3, and wherein to monitor the network traffic comprises to monitor the network traffic based on a present topology of the one or more virtual machines.

Example 5 includes the subject matter of any of Examples 1-4, and wherein to monitor the network traffic comprises to monitor the network traffic based on one or more network policies.

Example 6 includes the subject matter of any of Examples 1-5, and wherein to monitor the network traffic comprises to monitor the network traffic based on a present allocation of the computing resources of the computing device.

Example 7 includes the subject matter of any of Examples 1-6, and wherein to monitor the network traffic comprises to monitor the network traffic based on a present usage of the one or more virtual machines.

Example 8 includes the subject matter of any of Examples 1-7, and wherein the network traffic comprises network traffic received by the computing device.

Example 9 includes the subject matter of any of Examples 1-8, and wherein the network traffic comprises network traffic originated by the computing device.

Example 10 includes the subject matter of any of Examples 1-9, and wherein the network traffic comprises network traffic received by the computing device and network traffic originated by the computing device.

Example 11 includes the subject matter of any of Examples 1-10, and wherein the network traffic monitoring module is further to determine one or more network resource optimization recommendations based on results of the network traffic monitoring.

Example 12 includes the subject matter of any of Examples 1-11, and wherein the network resource management module is further to adjust an allocation of the computing resources based on the one or more network resource optimization recommendations.

Example 13 includes the subject matter of any of Examples 1-12, and wherein the computing resources further include an allocable portion of a memory of the computing device, and wherein to adjust the allocation of the computing resources comprises to adjust an allocation of the memory of the computing device to the one or more virtual machines.

Example 14 includes the subject matter of any of Examples 1-13, and wherein the computing resources further include an allocable portion of a processor of the computing device, and wherein to adjust the allocation of the computing resources comprises to adjust an allocation of the processor of the computing device to the one or more virtual machines.

Example 15 includes the subject matter of any of Examples 1-14, and wherein to adjust the allocation of the computing resources comprises to redirect at least a portion of the network traffic to a hardware accelerator.

Example 16 includes the subject matter of any of Examples 1-15, and wherein to adjust the allocation of the computing resources comprises to create additional virtual machines.

Example 17 includes the subject matter of any of Examples 1-16, and wherein to adjust the allocation of the computing resources comprises to suspend one or more of the one or more virtual machines.

Example 18 includes the subject matter of any of Examples 1-17, and, wherein to adjust the allocation of the computing resources comprises to shut down one or more of the one or more virtual machines.

Example 19 includes the subject matter of any of Examples 1-18, and further including a network policy enforcement module to detect network traffic that does not comply with a network policy and take corrective action on the network traffic to enforce compliance with the network policy.

Example 20 includes the subject matter of any of Examples 1-19, and wherein to take corrective action on the network traffic comprises to drop one or more network packets associated with the network traffic that does not comply with the network policy.

Example 21 includes the subject matter of any of Examples 1-20, and wherein to take corrective action on the network traffic comprises to change a routing policy associated with the network traffic that does not comply with the network policy.

Example 22 includes the subject matter of any of Examples 1-21, and wherein to take corrective action on the network traffic comprises to change a switching policy associated with the network traffic that does not comply with the network policy.

Example 23 includes a method for monitoring network traffic, the method comprising managing, by a computing device, computing resources of the computing device, wherein the computing resources include one or more virtual machines to process the network traffic; and monitoring, by a graphics processing unit (GPU) of the computing device, the network traffic processed by the one or more virtual machines.

Example 24 includes the subject matter of Example 23, and further including transmitting results of the monitored network traffic to a network controller in network communication with the computing device; and receiving one or more network resource optimization recommendations from the network controller based on the results of the monitored network traffic.

Example 25 includes the subject matter of any of Examples 23 and 24, and wherein transmitting results of the monitored network traffic to the network controller comprises transmitting results of the monitored network traffic to a network controller in remote network communication with the computing device.

Example 26 includes the subject matter of any of Examples 23-25, and wherein monitoring the network traffic comprises monitoring the network traffic based on a present topology of the one or more virtual machines.

Example 27 includes the subject matter of any of Examples 23-26, and wherein monitoring the network traffic comprises monitoring the network traffic based on one or more network policies.

Example 28 includes the subject matter of any of Examples 23-27, and wherein monitoring the network traffic comprises monitoring tor the network traffic based on a present allocation of the computing resources of the computing device.

Example 29 includes the subject matter of any of Examples 23-28, and wherein monitoring the network traffic comprises monitoring the network traffic based on a present usage of the one or more virtual machines.

Example 30 includes the subject matter of any of Examples 23-29, and wherein monitoring the network traffic comprises monitoring network traffic received by the computing device.

Example 31 includes the subject matter of any of Examples 23-30, and wherein monitoring the network traffic comprises monitoring network traffic originated by the computing device.

Example 32 includes the subject matter of any of Examples 23-31, and wherein monitoring the network traffic comprises monitoring network traffic received by the computing device and network traffic originated by the computing device.

Example 33 includes the subject matter of any of Examples 23-32, and further comprising determining one or more network resource optimization recommendations based on results of the monitored network traffic.

Example 34 includes the subject matter of any of Examples 23-33, and further including adjusting an allocation of the computing resources based on the one or more network resource optimization recommendations.

Example 35 includes the subject matter of any of Examples 23-34, and wherein the computing resources further include an allocable portion of a memory of the computing device, and wherein adjusting the allocation of the computing resources comprises adjusting an allocation of the memory of the computing device to the one or more virtual machines.

Example 36 includes the subject matter of any of Examples 23-35, and wherein the computing resources further include an allocable portion of a processor of the computing device, and wherein adjusting the allocation of the computing resources comprises adjusting an allocation of the processor of the computing device to the one or more virtual machines.

Example 37 includes the subject matter of any of Examples 23-36, and wherein adjusting the allocation of the computing resources comprises redirecting at least a portion of the network traffic to a hardware accelerator.

Example 38 includes the subject matter of any of Examples 23-37, and wherein adjusting the allocation of the computing resources comprises creating additional virtual machines.

Example 39 includes the subject matter of any of Examples 23-38, and wherein adjusting the allocation of the computing resources comprises suspending one or more of the one or more virtual machines.

Example 40 includes the subject matter of any of Examples 23-39, and wherein adjusting the allocation of the computing resources comprises shutting down one or more of the one or more virtual machines.

Example 41 includes the subject matter of any of Examples 23-40, and further including detecting network traffic that does not comply with a network policy; and taking a corrective action on the network traffic to enforce compliance with the network policy.

Example 42 includes the subject matter of any of Examples 23-41, and wherein taking corrective action on the network traffic comprises dropping one or more network packets associated with the network traffic that does not comply with the network policy.

Example 43 includes the subject matter of any of Examples 23-42, and wherein taking corrective action on the network traffic comprises changing one of a routing policy associated with the network traffic that does not comply with the network policy.

Example 44 includes the subject matter of any of Examples 23-43, and wherein taking corrective action on the network traffic comprises changing one of a switching policy associated with the network traffic that does not comply with the network policy.

Example 45 includes a computing device comprising a processor; and a memory having stored therein a plurality of instructions that when executed by the processor cause the computing device to perform the method of any of Examples 23-44.

Example 46 includes one or more machine readable storage media comprising a plurality of instructions stored thereon that in response to being executed result in a computing device performing the method of any of Examples 23-44.

Example 47 includes a computing device for monitoring network traffic, the computing device comprising means for managing, by a computing device, computing resources of the computing device, wherein the computing resources include one or more virtual machines to process the network traffic; and means for monitoring, by a graphics processing unit (GPU) of the computing device, the network traffic processed by the one or more virtual machines.

Example 48 includes the subject matter of Example 47, and further including means for transmitting results of the monitored network traffic to a network controller; and means for receiving one or more network resource optimization recommendations from the network controller based on the results of the monitored network traffic.

Example 49 includes the subject matter of any of Examples 47 and 48, and wherein the means for transmitting results of the monitored network traffic to the network controller comprises means for transmitting results of the monitored network traffic to a network controller in remote network communication with the computing device.

Example 50 includes the subject matter of any of Examples 47-49, and wherein means for monitoring the network traffic comprises means for monitoring the network traffic based on a present topology of the one or more virtual machines.

Example 51 includes the subject matter of any of Examples 47-50, and wherein the means for monitoring the network traffic comprises means for monitoring the network traffic based on one or more network policies.

Example 52 includes the subject matter of any of Examples 47-51, and wherein the means for monitoring the network traffic comprises means for monitoring tor the network traffic based on a present allocation of the computing resources of the computing device.

Example 53 includes the subject matter of any of Examples 47-52, and wherein the means for monitoring the network traffic comprises means for monitoring the network traffic based on a present usage of the one or more virtual machines.

Example 54 includes the subject matter of any of Examples 47-53, and wherein the means for monitoring the network traffic comprises means for monitoring network traffic received by the computing device.

Example 55 includes the subject matter of any of Examples 47-54, and wherein the means for monitoring the network traffic comprises means for monitoring network traffic originated by the computing device.

Example 56 includes the subject matter of any of Examples 47-55, and wherein the means for monitoring the network traffic comprises means for monitoring network traffic received by the computing device and network traffic originated by the computing device.

Example 57 includes the subject matter of any of Examples 47-56, and further comprising means for determining one or more network resource optimization recommendations based on results of the monitored network traffic.

Example 58 includes the subject matter of any of Examples 47-57, and further including means for adjusting an allocation of the computing resources based on the one or more network resource optimization recommendations.

Example 59 includes the subject matter of any of Examples 47-58, and wherein the computing resources further include an allocable portion of a memory of the computing device, and wherein the means for adjusting the allocation of the computing resources comprises means for adjusting an allocation of the memory of the computing device to the one or more virtual machines.

Example 60 includes the subject matter of any of Examples 47-59, and wherein the computing resources further include an allocable portion of a processor of the computing device, and wherein the means for adjusting the allocation of the computing resources comprises means for adjusting an allocation of the processor of the computing device to the one or more virtual machines.

Example 61 includes the subject matter of any of Examples 47-60, and wherein the means for adjusting the allocation of the computing resources comprises means for redirecting at least a portion of the network traffic to a hardware accelerator.

Example 62 includes the subject matter of any of Examples 47-61, and wherein the means for adjusting the allocation of the computing resources comprises means for creating additional virtual machines.

Example 63 includes the subject matter of any of Examples 47-62, and wherein the means for adjusting the allocation of the computing resources comprises means for suspending one or more of the one or more virtual machines.

Example 64 includes the subject matter of any of Examples 47-63, and wherein the means for adjusting the allocation of the computing resources comprises means for shutting down one or more of the one or more virtual machines.

Example 65 includes the subject matter of any of Examples 47-64, and further including means for detecting network traffic that does not comply with a network policy; and means for taking a corrective action on the network traffic to enforce compliance with the network policy.

Example 66 includes the subject matter of any of Examples 47-65, and wherein the means for taking corrective action on the network traffic comprises means for dropping one or more network packets associated with the network traffic that does not comply with the network policy.

Example 67 includes the subject matter of any of Examples 47-66, and wherein the means for taking corrective action on the network traffic comprises means for changing one of a routing policy associated with the network traffic that does not comply with the network policy.

Example 68 includes the subject matter of any of Examples 47-67, and wherein the means for taking corrective action on the network traffic comprises means for changing one of a switching policy associated with the network traffic that does not comply with the network policy.

The invention claimed is:

1. A computing device to monitor network traffic, the computing device comprising:
    a graphics processing unit;
    one or more processors; and
    a non-transitory, computer-readable storage media including a plurality of instructions stored thereon that, when executed by the graphics processing unit, cause the computing device to:
        monitor, by the graphics processing unit of the computing device, the network traffic processed by one or more virtual machines located on the computing device in parallel with processing of the network traffic by the one or more virtual machines, results of the monitored network traffic to be transmitted to an orchestrator.

2. The computing device of claim 1, wherein the plurality of instructions, when executed further cause the computing device to adjust an allocation of computing resources based on one or more network resource recommendations received from the orchestrator based on the results of the monitored network traffic, wherein to adjust the allocation of the computing resources comprises to redirect at least a portion of the network traffic to a hardware accelerator.

3. The computing device of claim 2, wherein the plurality of instructions, when executed further cause the computing device to take a corrective action on network traffic to enforce compliance with a network policy in response to a determination that at least a portion of the network traffic does not comply with a network policy, the corrective action comprises to manage switching policies of a virtual switch of the computing device.

4. The computing device of claim 3, wherein to manage the switching policies of the virtual switch of the computing device comprises to drop the network traffic that does not comply with the network policy.

5. The computing device of claim 1, wherein to monitor the network traffic comprises to monitor the network traffic based on a present topology of the one or more virtual machines.

6. The computing device of claim 1, wherein the network traffic comprises network traffic originated by the computing device.

7. One or more non-transitory, computer-readable storage media comprising a plurality of instructions that in response to being executed causes a computing device to:
monitor, by a graphics processing unit, network traffic processed by one or more virtual machines located on the computing device in parallel with processing of the network traffic by the one or more virtual machines, results of the monitored network traffic to be transmitted to an orchestrator.

8. The one or more non-transitory, computer-readable storage media of claim 7, further comprising a plurality of instructions that in response to being executed cause the computing device to adjust an allocation of computing resources based on the one or more network resource recommendations received from the orchestrator based on the results of the monitored network traffic, wherein to adjust the allocation of the computing resources comprises to redirect at least a portion of the network traffic to a hardware accelerator.

9. The one or more non-transitory, computer-readable storage media of claim 8, further comprising a plurality of instructions that in response to being executed cause the computing device to take a corrective action on network traffic to enforce compliance with a network policy in response to a determination that at least a portion of the network traffic does not comply with a network policy, the corrective action comprises to manage switching policies of a virtual switch of the computing device.

10. The one or more non-transitory, computer-readable storage media of claim 9, wherein to manage the switching policies of the virtual switch of the computing device comprises to drop the network traffic that does not comply with the network policy.

11. The one or more non-transitory, computer-readable storage media of claim 7, wherein to monitor the network traffic comprises to monitor the network traffic based on a present topology of the one or more virtual machines.

12. The one or more non-transitory, computer-readable storage media of claim 7, wherein the network traffic comprises network traffic originated by the computing device.

13. A method for monitoring network traffic, the method comprising:
monitoring, by a graphics processing unit, network traffic processed by one or more virtual machines located on a computing device in parallel with processing of the network traffic by the one or more virtual machines, results of the monitored network traffic to be transmitted to an orchestrator.

14. The method of claim 13, further comprising:
adjusting an allocation of computing resources based on one or more network resource recommendations received from the orchestrator based on the results of the monitored network traffic, wherein to adjust the allocation of the computing resources comprises to redirect at least a portion of the network traffic to a hardware accelerator.

15. The method of claim 14, further comprising:
taking a corrective action on network traffic to enforce compliance with a network policy in response to a determination that at least a portion of the network traffic does not comply with a network policy, the corrective action comprises to manage switching policies of a virtual switch of the computing device.

16. The method of claim 15, wherein to manage the switching policies of the virtual switch of the computing device comprises to drop the network traffic that does not comply with the network policy.

17. The method of claim 13, wherein monitoring the network traffic comprises to monitor the network traffic based on a present topology of the one or more virtual machines.

18. The method of claim 13, wherein the network traffic comprises network traffic originated by the computing device.

* * * * *